May 12, 1936.  J. T. MARVIN  2,040,776
RELIEF VALVE
Filed Jan. 11, 1934
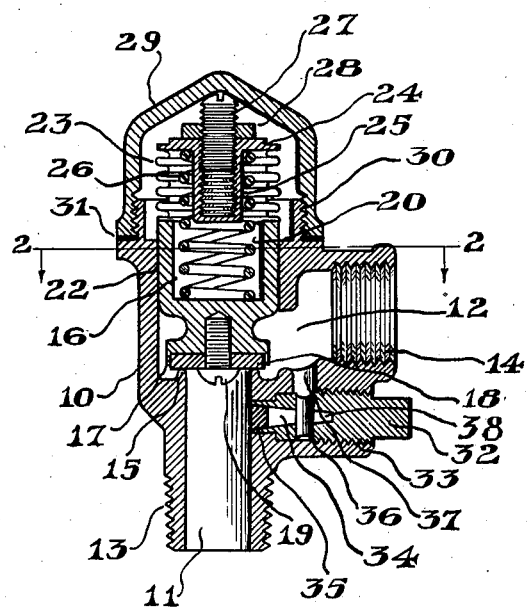
Fig. 1
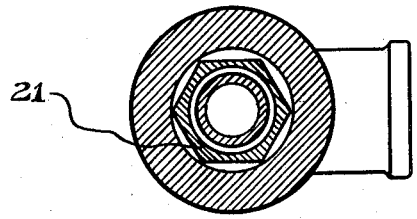
Fig. II.
INVENTOR.
JOHN T. MARVIN
BY Warren H. Schmieding
ATTORNEY.

Patented May 12, 1936

2,040,776

UNITED STATES PATENT OFFICE 2,040,776

RELIEF VALVE

John T. Marvin, Cleveland, Ohio, assignor to The Patrol Valve Company, Cleveland, Ohio, a corporation of Ohio Application January 11, 1934, Serial No. 706,249

6 Claims. (Cl. 137—53)

This invention relates to relief valves and particularly to relief valves used in connection with storage tanks for water heating systems.

It is an object of the invention to provide an improved adjustable pressure responsive valve in which the spring for holding the valve seated under normal conditions is completely enclosed in an expansible element.

A further object is to provide a valve structure in which all the movable parts are removable as a unit for repair and replacement.

Another object is to provide a valve which in addition to having the aforesaid pressure responsive relief mechanism also embodies a temperature responsive relief device comprising a fusible metal plug normally closing a port.

Other objects and advantages of the invention will be apparent from the following description and accompanying drawing wherein:

Fig. 1 is a vertical sectional view of a relief valve embodying the invention and Fig. 2 is a sectional view taken on the line 2—2 of Fig. 1, looking in the direction of the arrows.

Referring to the drawing, 10 denotes a valve casing having an inlet port 11 and an outlet port 12 for waste water. The lower end of the valve casing about the port 11 is externally screw-threaded as at 13 for engagemnt with the storage tank (not shown), and the portion of the casing about the outlet port 12 is screw-threaded internally as at 14 to receive a pipe for conveying waste water to a drain.

A valve seat 15 is interposed between the ports 11 and 12. The valve cooperating with the seat 15 and normally preventing communication between the inlet and outlet ports comprises a cage 16 having at its lower end a circular recess 17 which receives a washer 18, preferably made of some relatively yieldable material such as hard rubber or fibre, and removably attached to the cage 16 by a screw 19. The upper end of the cage has a cylindrical bore 20 and the outer surface of the upper end of the cage adjacent the bore is preferably hexagonal in shape as indicated at 21. The bore 22 of the valve casing 10 about the hexagonal surface of cage 16 is preferably circular so that the edges of the hexagonal surface of the cage have an easy sliding fit with respect to the bore 22.

A sylphon bellows 23 has its lower end attached to the upper end of cage 16 in fluid-tight relation, and the upper end of the bellows is attached in fluid-tight relation to a cap 24 which has a hollow central downwardly extending projection 25 serving as a guide for a spring 26 which is disposed between the cap 24 and the bottom of the bore 20 provided in the cage 16. The projection 25 is internally screw-threaded for receiving an adjusting screw 27, which screw is provided with a lock nut 28.

A screw-threaded cap 29 engages a threaded portion 30 provided on the upper surface of casing 10 and serves as an abutment for the screw 27. A washer 31 may be provided between the cap and the casing to prevent leakage at this point.

The temperature relief portion of the impioved valve comprises a removable plug 32 screw-threaded into a port 33 provided in the valve casing below the valve seat 15, and in communication with the inlet port or passage 11. The plug 32 has at its inner end a tapered port 34 normally closed by a plug 35 of fusible metal, which port 34 is in communication with a port 36 extending transversely across the removable plug 32. The port 36 is in open communication with a port 37 provided in the valve body 16 and extending to the outlet waste water opening 12.

In the operation of the device the development of a pressure in the storage tank greater than that which the spring 26 exerts causes unseating of the valve with respect to seat 15 and consequently the excessive pressure is relieved, with the waste water going out past the valve seat through outlet passage 12. When the excessive pressure has been relieved, the valve reseats under the influence of spring 26. The relief pressure is determined by the adjustment of screw 27 with respect to the projection 25.

The occurrence of an excessive temperature in the tank causes the melting of plug 35 and consequently the flow of hot water through ports 34, 36 and 37 to outlet passage 12. To replace the fusible plug 35 it is only necessary to remove plug 32 and insert a new fusible plug in the port 34. It sometimes happens in a valve of this type that when the fusible metal plug blows out it rehardens in the relief port such as port 36, by coming into contact with the colder metal remote from the inlet opening and thereby prevents or materially reduces the flow of the overheated water to the outlet passage. To overcome this difficulty I may provide a recess 38 opposite the end of port 34. When the fusible plug 35 yields, the pressure of the hot water drives the molten metal into the recess 38 and thus an open passage for the water to the outlet 12 is insured.

When the cap 29 is removed it is apparent that the cage 16, washer 18, bellows 23, cap 24 and spring 26 may be removed as a unit. This construction renders the washer 17 instantly accessible for replacement.

The spring 26 is completely enclosed and thus is not subject to corrosion by contact with water flowing past the valve seat. In other constructions with which I am familiar the spring has been protected by the use of a large flat diaphragm, but such a construction increases the valve to an unwieldly size. Moreover, in such construction the spring and diaphragm are not removable as a unit from the valve casing.

While I have shown and described a specific embodiment of the invention it will be apparent that other forms might be adopted all coming within the scope of the appended claims.

I claim:

1. A relief valve structure comprising a valve casing having inlet and outlet ports and a valve seat therebetween, means for controlling fluid flow past said valve seat, said means comprising a valve cage engageable with said valve seat, a spring having a portion disposed in a recess provided in said cage and urging said valve cage toward the seat, an expansible member attached to the valve cage and forming an enclosure for the spring, a cap member secured to the expansible means, adjustable means carried by the cap member for varying the effectiveness of the spring, and a removable cap member closing an opening in the valve casing and serving as an abutment for said adjustable means.

2. A relief valve structure comprising a valve casing having inlet and outlet ports and a valve seat therebetween, means for controlling fluid flow past said valve seat, said means comprising a valve cage engageable with said valve seat, a spring having a portion disposed in a recess provided in said cage and urging said valve cage toward the seat, an expansible member attached to the valve cage and forming an enclosure for the spring, a cap member secured to the expansible means, adjustable means carried by the cap member for varying the effectiveness of the spring, and a removable cap member closing an opening in the valve casing and serving as an abutment for said adjustable means, said cage, spring, expansible member and adjustable means being removable as a unit from the valve casing through the opening closed by said removable cap member.

3. A relief valve comprising a valve casing having inlet and outlet ports and a valve seat therebetween; a unitary subassembly including a valve engageable with the valve seat, a closed housing having one end thereof connected with the valve, said housing having a flexible metallic wall adapted to be flexed by excessive pressure in the inlet port, means within the housing exerting a normal closing pressure on the valve; and a cap for the casing cooperating therewith to form an enclosure for the subassembly and engaging the end of the subassembly opposite the valve and serving as an abutment therefor.

4. A relief valve comprising a valve casing having inlet and outlet ports and a valve seat therebetween; a unitary subassembly including a valve engageable with the valve seat, a closed housing having one end thereof connected with the valve, said housing having a flexible metallic wall adapted to be flexed by excessive pressure in the inlet port, means within the housing exerting a normal closing pressure on the valve, and adjusting means extending outwardly from the end of the housing opposite the valve for varying the effectiveness of the valve closing means; and a cap for the casing cooperating therewith to form an enclosure for the subassembly and engaging the adjustment means and serving as an abutment therefor.

5. A relief valve comprising a valve casing having inlet and outlet ports and a valve seat therebetween; a unitary subassembly including a valve engageable with the valve seat, a closed housing having one end thereof connected with the valve, said housing having a flexible metallic wall adapted to be flexed by excessive pressure in the inlet port, means within the housing exerting a normal closing pressure on the valve; and a cap for the casing cooperating therewith to form an enclosure for the subassembly and engaging the end of the subassembly opposite the valve and serving as an abutment therefor, said subassembly including adjustable means interposed between the valve and cap for varying the effectiveness of the valve closing means.

6. A relief valve comprising a valve casing having inlet and outlet ports and a valve seat therebetween; a unitary subassembly including a valve engageable with the valve seat, a closed housing having one end thereof connected with the valve and the opposite end thereof carrying an outwardly extending adjustable screw, said housing having a flexible metallic wall adapted to be flexed by excessive pressure in the inlet port, means within the housing exerting a normal closing pressure on the valve; and a cap for the casing cooperating therewith to form an enclosure for the subassembly and engaging said screw and serving as an abutment therefor.

JOHN T. MARVIN.